(12) United States Patent  (10) Patent No.: US 8,869,846 B2
Gerdes  (45) Date of Patent: Oct. 28, 2014

(54) NECK END FOR A FILLER NECK

(75) Inventor: Ralf Gerdes, Cologne (DE)

(73) Assignee: Gerdes GmbH, Kerpen (DE)

( * ) Notice: Subject to any disclaimer, the term of this patent is extended or adjusted under 35 U.S.C. 154(b) by 974 days.

(21) Appl. No.: 12/991,661

(22) PCT Filed: May 11, 2009

(86) PCT No.: PCT/EP2009/055682
§ 371 (c)(1),
(2), (4) Date: Jan. 19, 2011

(87) PCT Pub. No.: WO2009/135954
PCT Pub. Date: Nov. 12, 2009

(65) Prior Publication Data
US 2011/0108563 A1   May 12, 2011

(30) Foreign Application Priority Data
May 9, 2008   (DE) .......................... 10 2008 022 912

(51) Int. Cl.
*B65B 1/04*   (2006.01)
*B60K 15/04*   (2006.01)

(52) U.S. Cl.
CPC ......... *B60K 15/04* (2013.01); *B60K 2015/0445* (2013.01); *B60K 2015/0483* (2013.01); *B60K 2015/0429* (2013.01); *B60K 15/0403* (2013.01)
USPC .......................... 141/350; 220/86.2; 220/86.3

(58) Field of Classification Search
USPC ......... 141/206, 302, 348–350; 220/86.2, 86.3
See application file for complete search history.

(56) References Cited

U.S. PATENT DOCUMENTS

| | | | |
|---|---|---|---|
| 4,091,959 A | 5/1978 | O'Banion | |
| 4,265,752 A | 5/1981 | O'Banion | |

(Continued)

FOREIGN PATENT DOCUMENTS

| | | |
|---|---|---|
| AT | 9752 | 3/2008 |
| BE | 1016911 | 9/2007 |

(Continued)

OTHER PUBLICATIONS

Fornuto, Joseph, et al., "Fuel Filler Cap"; Research Disclosure, Mason Publications, Hampshire, GB; vol. 352, No. 59; Aug. 1, 1993; (2 pages).

(Continued)

*Primary Examiner* — Jason J Niesz
(74) *Attorney, Agent, or Firm* — Panitch Schwarze Belisario & Nadel LLP

(57) ABSTRACT

The invention relates to an in particular capless neck end for a container, in particular a fuel container, with a double-flap closure which is formed by an upper pivoting flap (12) and a lower sealing flap (2). Neck ends of this type are known from WO 2006/084908. These known neck ends require too much installation space and are not optimally protected from the contents of the container being pumped out. This is improved by the invention in that the lower sealing flap is arranged in such a manner that it is arranged at an angle to the transverse section plane arranged at right angles to the neck axis (S) when in the closed state, and either the articulation point or, when in the closed state, the end opposite the articulation point of the lower sealing flap is arranged above the lower end of the first circular segment path. Furthermore, an anti-theft means (25) in the form of a mechanical barrier is provided below the double-flap closure.

15 Claims, 9 Drawing Sheets

(56) References Cited

U.S. PATENT DOCUMENTS

| | | |
|---|---|---|
| 4,686,554 A | 8/1987 | Ohmi et al. |
| 4,715,509 A | 12/1987 | Ito et al. |
| 5,454,854 A | 10/1995 | Harashima et al. |
| 6,691,750 B1 * | 2/2004 | Foltz ............................ 141/350 |
| 8,047,393 B2 * | 11/2011 | Feichtinger .................. 220/86.2 |
| 2002/0092581 A1 | 7/2002 | Hagano et al. |
| 2004/0211411 A1 | 10/2004 | Hoelz et al. |
| 2006/0060581 A1 | 3/2006 | Foltz |
| 2008/0271816 A1 | 11/2008 | Gerdes |
| 2008/0308182 A1 | 12/2008 | Fowler |
| 2009/0001077 A1 | 1/2009 | Feichtinger |
| 2009/0194198 A1 | 8/2009 | Bar et al. |

FOREIGN PATENT DOCUMENTS

| | | |
|---|---|---|
| CN | 1421360 A | 6/2003 |
| CN | 101155708 A | 4/2008 |
| DE | 3223991 | 10/1983 |
| DE | 20309799 U1 | 8/2004 |
| DE | 202005012620 | 10/2005 |
| DE | 102005047459 | 8/2006 |
| EP | 0047825 A1 | 3/1982 |
| EP | 1262355 A1 | 12/2002 |
| EP | 1319545 A1 | 6/2003 |
| EP | 1086842 | 10/2005 |
| EP | 1690726 | 8/2006 |
| FR | 2753139 | 3/1998 |
| FR | 2905638 | 3/2008 |
| GB | 2424870 | 10/2006 |
| JP | 4-48027 U | 4/1992 |
| WO | WO-2006/084908 A3 | 11/2006 |

OTHER PUBLICATIONS

PCT International Preliminary Search Report on Patentability & Written Opinion; PCT/EP2009/055682; Authorized Officer: Agnes Wittmann-Regis; Dec. 6, 2010.

* cited by examiner

NECK END FOR A FILLER NECK

CROSS REFERENCE TO RELATED APPLICATIONS

The present application claims priority to PCT International Application No. PCT/EP2009/055682 filed on May 11, 2009 which claims priority to German Patent Application Serial No. DE 10 2008 022 912.1 filed on May 9, 2008.

STATEMENT RE: FEDERALLY SPONSORED RESEARCH/DEVELOPMENT

Not Applicable.

BACKGROUND

1. Technical Field of the Invention

The invention relates to a neck end for a filling neck of a container, in particular a tank of a motor vehicle, with a pipe piece and a closure mechanism which has an upper pivoting flap arranged in the pipe piece and a lower sealing flap arranged thereunder, wherein the upper pivoting flap and the lower sealing flap are articulated about an articulation point on one side of the pipe neck, and in each case the upper pivoting flap can be opened with its end opposite the articulation point along a first circular segment path as a result of a pivoting movement about the articulation point by the pressure of an introduced filling pipe, and the lower sealing flap can be opened along a second circular segment path as a result of a pivoting movement about the articulation point.

Such neck ends are mostly used without an additional cap behind a pivoting flap for closing a fuel tank of a motor vehicle. The invention is however not limited to this use, but relates to all neck ends for other fillable containers which can be closed automatically by means of a double flap even if they have an additional cap or are permanently connected to a neck pipe. Such containers can for example be oil tanks for the engine oil of motor vehicles or else water tanks of ships etc.

2. Description of Related Art

Neck ends which can be closed without needing a cap are known from DE 203 09 799.8 U. In the neck end described in the cited document, the neck is closed by means of two flaps which are arranged one above the other in the neck and are held against a sealing face by the force of one closure spring each. When the output pipe of a pump nozzle or a spout of a storage canister is inserted, the two flaps are pressed downwards, producing a continuous opening.

Although this closure provides good sealing even without an additional tank cap, it would be desirable if it could be further improved and additionally had a means for preventing incorrect filling. In particular in the case of modern engines, it is increasingly important to ensure the correct type of fuel, as for example modern injection systems in common rail diesel injection are lubricated by the lubricant content of the diesel fuel and can suffer severe damage even after a short operating time with petrol.

EP 1319545 A describes such a method for preventing a neck from being filled with unsuitable fuel. To do this, hooks are distributed over the circumference of the neck, which hooks have a bent central region which is then pushed away by the front edge of the pump nozzle when the pump nozzle has a sufficient diameter. As a result, the hooks at least cannot all be displaced outwards if a pump nozzle which is too small is inserted, in which case the lower part of the pump nozzle engages with the end regions of the hooks which are not pushed outwards, so that the pump nozzle cannot be introduced further into the neck but snags.

Although this neck provides the possibility of preventing incorrect filling, it has the disadvantage that although the pump nozzle cannot be introduced completely into the neck, filling of the neck with at least a small amount would still be possible with corresponding disregard of the safety instructions, because no cap is blocked with the safety elements, only the pump nozzle is prevented from being inserted into the neck. This does not however prevent the filling function of the snagged, excessively small pipe of the pump nozzle from being operated, with the result that fuel of an unsuitable type then flows into the neck.

A further disadvantage of this configuration consists in that the displacement of the hooks requires a lot of mechanical effort, which results in unreliable functioning. For example, some of the hooks can be pushed away by inserting the pump nozzle in a tilted manner and with a certain amount of force, so that only some of the hooks engage which can then bend according to their function. Over time, the neck end can be damaged in this manner, in particular if the user of the vehicle tries to force the pipe of the pump nozzle in.

EP 1262355 A again discloses a capless neck end which has a means for preventing filling with the wrong fuel in its lower region. To do this, a safety element which can be displaced transversely to the neck longitudinal axis and is displaced to the side by the penetrating pipe section of the pump nozzle is provided above a lower covering flap. As a result of this displacement movement, an edge of the lower covering plate is disengaged so that a lock which is produced by this engagement between the displacement element and the lower covering flap is lifted and the pump nozzle can be inserted further, with the lower covering flap pivoting up.

This configuration firstly has the disadvantage that the pump nozzle rests directly on the lower covering flap, that is, acts on the actual closure flap of the neck. If attempts are then made to fill up with the "wrong" pump nozzle, this can cause damage to this sealing flap as a result of the pressure on the lower covering flap, which is not unlocked.

A further disadvantage of this configuration is that tilted, oblique placement of the pump nozzle can likewise cause unlocking although the diameter of the pipe of the pump nozzle is actually too small. Furthermore, the engagement of the lower covering plate in the groove of the displacement element is comparatively prone to faults, as this groove can become damaged or disengaged for example owing to dirt or wear as a result of the regularly occurring lateral sliding of the pipe in the displacement element. In this case, however, the safety function is cancelled, with the result that the lower cover can be tilted downwards even with smaller pipe diameters.

A further disadvantage of this configuration consists in that the safety means also allows the nose of an unsuitable pump nozzle to be inserted comparatively deeply before the driver can establish that the pump nozzle does not actually fit into the neck. Many users will however not realise this, but will instead think that this is normal for this configuration, that the pipe section of the pump nozzle cannot be completely sunk, or will assume that the neck is defective. This can result in this user either continuing to push with force or starting to fill up, which then in turn results in the petrol flowing into the region between the upper edge of the neck end and the lower cover and flowing from there either into the fuel supply through the legally required return line to the tank or into the reserve tank. Neither of these is desirable in practice, for understandable reasons.

WO 2006/084908 describes a neck end with two pivoting flaps as a capless closure, in this case the upper pivoting flap being configured to prevent filling with unsuitable fuel and the actual seal of the tank being formed by the lower pivoting flap.

Although this solution provides reliable sealing and sufficient protection from incorrect filling, it has the disadvantage, as in the other, above-described solutions, that the thickened end region of the pipe neck which must receive the capless mechanism must be relatively long to be able to accommodate the mechanical functional elements. This in turn results in a larger space requirement for the pipe neck, which is not always available, depending on the vehicle design and in particular with subsequent conversion from a conventional to a capless neck with an otherwise unchanged vehicle design.

A further disadvantage of the prior art is the fact that the capless necks are not sufficiently secure from the introduction of a drainage hose with the intention of theft. This is mostly solved by means of external covering flaps, the lock of which can also usually be levered off comparatively easily.

BRIEF SUMMARY OF THE INVENTION

The object of the invention is therefore to create an automatically closing neck end which can be opened by the pressure of an output pipe of the type mentioned at the start, which is optimised with respect to space requirement and theft protection.

This object is achieved with respect to the space requirement by a neck end which is characterised in that the lower sealing flap is arranged in such a manner that it is arranged at an angle to the cross-sectional plane arranged at right angles to the neck axis (S) when in the closed state, and either the articulation point or, when in the closed state, the end opposite the articulation point of the lower sealing flap is arranged above the lower end of the first circular segment path.

With respect to theft protection, this object is achieved in that an anti-theft means for preventing the introduction of a pipe or tube, which means is formed by a mechanical barrier to introduction and allows liquid through, is provided as drainage and theft prevention beneath the lower sealing flap, which is possible in particular by part of the gain in space which can be achieved as a result of the solution of the space.

In generic neck ends, the upper pivoting flap is opened first by the inserted "nose", that is, the output pipe of the pump nozzle in the case of a fuel tank. As the output pipe penetrates further, the lower sealing flap is then pushed open and the filling process can start, as the fuel can now flow downwards into the tank and does not activate the safety lock of the pump nozzle. This would be the case before pushing open the lower sealing flap, as fuel then collects in the space between the two flaps and simulates an already full tank.

The invention then moves the lower sealing flap upwards in the direction of the upper pivoting flap. So that the latter can be opened without colliding with the lower sealing flap, as it opens first and pivots downwards, the lower sealing flap is positioned obliquely so that it lies outside the line of movement of the upper pivoting flap. It can also be bent so that even better utilisation of space in the neck longitudinal direction is possible, but in this case it can be necessary to curve the side wall of the pipe neck outwards depending on flap size and neck diameter.

Thanks to the highly placed lower sealing flap there is still enough space to activate the deactivation function of the pump nozzle when the output pipe is not introduced deeply enough. On the other hand, space obtained below the lower sealing flap can be used either to reduce the installation space of the neck unit or and possibly also to provide an anti-theft means.

As the double-flap necks generally replace the conventional (lockable) tank caps, the usual anti-theft means is no longer available. Although a flap which can be closed, for example by the central locking of the motor vehicle, can be provided in front of the neck end, this has the disadvantage that it can be levered off relatively easily and must furthermore also be present.

A second aspect of the invention is that of the improved protection from pumping out or extracting the container contents. This is achieved according to the invention by a mechanical barrier which is arranged below the lower sealing flap. This anti-theft means allows liquid through, so it does not impede filling up. However, it prevents pipes or hoses from being inserted so far into the tank that they dip below the liquid level and make it possible to extract liquid.

Further features and advantages of the invention can be found in the subclaims and in the following description of preferred exemplary embodiments of the invention using the drawings.

BRIEF DESCRIPTION OF THE DRAWINGS

These and other features and advantages of the various embodiments disclosed herein will be better understood with respect to the following description and drawings, in which like number refer to like parts throughout, and in which.

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments.

DETAILED DESCRIPTION

Figure 1:
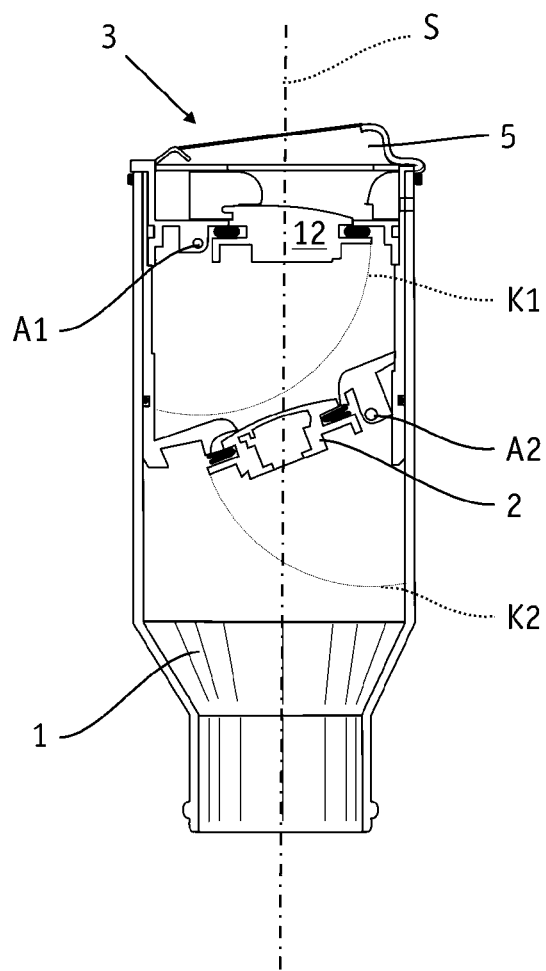
FIG. 1 shows a schematic side view of a neck end according to the invention.
Figure 2:
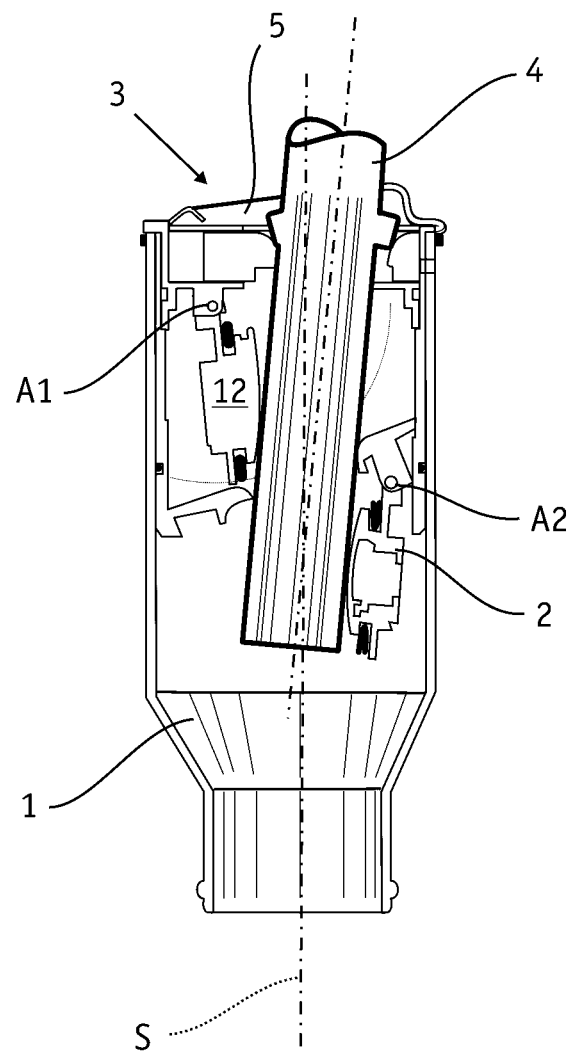
FIG. 2 shows the neck end of FIG. 1 with an inserted filling pipe.

FIGS. 1 and 2 show a neck end according to the invention for the filling neck of a container. Such a container can be the tank of a motor vehicle, as in the exemplary embodiment shown. This container has a double-flap closure which is formed by the upper pivoting flap 12 and the lower sealing flap 2. The neck insert has a widened diameter in the region of the flaps compared to the lower section of the filling neck 1, to be able to receive the closure mechanism and to be able to introduce the filling pipe 4 of a pump nozzle as shown in FIG. 2. The filling neck 1 extends along a straight or curved neck axis S and conducts the introduced fuel into the tank of the motor vehicle.

As in the exemplary embodiment shown, the neck end can be in two parts, an inner plug-in pipe which bears the closure mechanism being inserted into an outer retaining pipe of the filling neck 1. Seals arranged between the two components ensure that a gastight and fluid-tight connection is realised. The connection can furthermore be secured by detachable plug or clip connections against being inadvertently pulled out, for example if the user exerts a transverse force on the neck insert and at the same time pulls on the nozzle when pulling out the pump nozzle. The connection can be detachable to exchange the insert, preferably in such a manner that it can only be detached by specialist staff using a special tool. Such a connection can for example be formed from resilient latching elements which can be grasped on the underside of the neck insert so that they can be pulled back inwards. To this end, a special tool can be introduced into the neck through the introduction duct in the pump nozzle 4, which tool has circular elements which can grasp the resilient latching tabs and pull them inwards. Alternatively, the neck insert can also be screwed into the outer pipe by means of a screw- or bayonet connection.

The insert with the inner retaining pipe which bears the closure mechanism is preferably produced from plastic. The outer region of the filling neck 1 can likewise be produced from plastic or else from a sheet metal material, depending on the requirements of the filling neck 1 or its upper region. The configuration shown in FIGS. 1 and 2 has a facility for connection to the pipe of a filling neck 1 at its lower end. In this case the neck end is again configured as a separate component so that it can be connected to the pipe of the filling neck, this connection can also be secured by corresponding measures. The advantage of this two-part configuration consists in that during maintenance, for example if the closure mechanism should fail, the whole neck attachment can be removed so that it can be offered and installed as a separate spare part. Furthermore, the neck end can of course be produced from a different material from the lower section of the filling neck.

The neck ends according to the invention are used not only in completely new designs but also as part of updating a motor vehicle. In both cases there is often the problem that, because of the requested design or other reasons, there is not enough installation space to be able to install any desired size of neck end. On the other hand, the pivoting region of the upper closure flap 12 which closes the upper filling opening 5 is permanently defined, as the edge of the closure flap 12 opposite the articulation point 1 is moved along a first circular segment path K1. It is necessary for safety reasons for the closure flaps, that is, the upper closure flap 12 and the lower sealing flap 2, to be moved independently of each other so that they do not affect each other. This would be the case for example if the upper closure flap 12 pressed against the lower sealing flap 2 as part of the pivoting movement and could open the latter automatically.

For the above-mentioned reasons, the known neck ends have a distance between the upper closure flap 12 and the lower sealing flap 2, which distance corresponds at least to the radius of the circular segment path K1. This results in a predefined installation space, as a corresponding pivot radius must be available in the interior of the neck end below the lower sealing flap 2, the free end of which is moved along the circular segment path K2.

The installation space required should now be reduced according to the invention. To this end, the articulation point A2 of the lower sealing flap 2 is offset upwards within the neck end. To prevent a collision of the still closed, lower sealing flap 2 with the opening, upper pivoting flap 12 when a pump nozzle 4 is inserted, the lower sealing flap 2 is now no longer horizontal but tilted downwards so that it remains outside the movement region of the upper pivoting flap 12. An optimal result is achieved if the mechanism of the lower sealing flap 2 is essentially tangentially adjacent to the pivot radius of the upper pivoting flap, it being necessary of course for a certain distance to remain to prevent contact between the flaps. If, as in the exemplary embodiment shown, the assembly consisting of the sealing flap 2, its articulation A2 and the opposite abutment stop is somewhat deeper in the central region, because as in this case for example the sealing flap is offset downwards relative to the stop and to the abutment stop, the stop of the abutment flap can also be placed even higher so that an additional gain in space is produced.

Essential for the invention is the fact that the upwardly facing contour of the assembly is arranged due to the oblique position of the lower sealing flap 2 in such manner that it lies outside the line of movement of the outermost region of the upper pivoting flap 12 but is arranged as high as possible overall.

The gain in space in the region of the upper neck end is produced not only by the fact that the stop point A2 of the lower sealing flap 2 is offset upwards but also by the fact that the circular segment path K2, along which the outer, free edge of the lower sealing flap 2 is moved, is no longer a quadrant but only a fraction of the former quadrant, which is reduced compared to the quadrant by the angle of the oblique position. The shortening of the upper section of the filling neck which can be achieved is thus essentially defined by the length of the saved distance of the lower circular segment K2 compared to the quadrant. Even if this saving seems relatively small at first glance, it means that the design freedom of the motor vehicle designer and the ability of already known motor vehicles to be converted to the neck end according to the invention are substantially increased.

In the exemplary embodiment shown with mutually opposite articulation points A1 and A2, the advantage according to the invention of course only takes effect if the lower closure flap 2 and the upper pivoting flap 12 open in opposite directions, as otherwise the circular segment path K2 would be increased even more compared to horizontal installation.

A further configuration of a neck end (not shown here) has a lower sealing flap 2, which is concave as seen from the upper filling opening 5. This concave configuration results in the central sunk region shown in FIGS. 1 and 2 being realised even without the offset of the lower sealing flap 2 relative to the articulation point A2 and the opposite abutment, so that the available installation space can be optimised in the same manner. As the upper pivoting flap 12 has a round cross section, like the neck end itself, a central sunk portion of the lower sealing flap 12 is sufficient to achieve this effect.

The lower sealing flap 2 can be arranged inside the neck end in such a manner that it can be pivoted with the front region opposite the articulation point A2 into the narrower region of the lower filling neck 1. This region can then be round so that, owing to the larger diameter of the lower sealing flap 2 relative to the filling neck 1, this closure flap can only be opened by a certain angle, which must of course be large enough to allow the required amount of fuel through. It will however be preferable that the lower sealing flap 2 can be pivoted so far that the pump nozzle with its filling pipe 4 can be placed completely through the said sealing flap. This has the advantage that an unambiguous filling position is present which is reached after inserting by several centimeters so that a secure feeling for the user is produced when introducing the filling pipe 4 into the capless closure mechanism.

The neck end itself and also, if it is configured as an additional component relative to the other filling neck 1, is preferably configured in such a manner that it can only be placed on in an unambiguous orientation. This can be realised for example in that tongue and groove connections are provided between the inner plug-in pipe which holds the closure flaps and the outer retaining pipe of the two-part upper neck end shown in FIG. 1, so that the inner part of the neck end can only be inserted in one orientation, which is clear in the direction of rotation.

A further particular feature of the above-described tongue and groove connection can consist in that the association between the inner region and the outer region can be defined. Such a precaution is expedient for example if different inner inserts are used within a vehicle series of a manufacturer, so that there could be a risk that an inappropriate insert element is used during assembly or replacement. Furthermore, to prevent incorrect filling, for example, the diameters of the upper filling opening and also of the closure flaps, that is, the upper pivoting flap 12 and the lower sealing flap 2, for petrol vehicles can be kept so small that they cannot be filled with a diesel filling pipe 4. If incorrect filling is to be prevented by means of such a narrowing of the diameter, it is of course expedient that the incorrect component cannot be inserted into the neck end in the spare part. In this case a key system can be created by means of the distance between the tongues and grooves when a plurality of tongue and groove connections are used, so that virtually any number of codes are possible, by means of which it can be determined that only the matching insert can be inserted into the outer insert pipe.

In the same manner, in a two-part filling neck, that is, an upper neck end which holds the mechanism and a lower filling pipe, a corresponding code can be provided in the lower region. If incorrect filling can be excluded differently, as described below, a corresponding code and key can also be realised in that the neck attachment does not have a circular but an oval cross section in the lower region, that is, in the attachment region of the lower filling neck 1. The connection region of the lower pipe neck must then of course likewise be oval, with the same cross section geometry, so that the two components can be inserted into each other. An orientation of the installation position can then be defined by the selection of the elliptical cross section and a key, that is, an unambiguity during assembly, can be realised.

Figure 3:
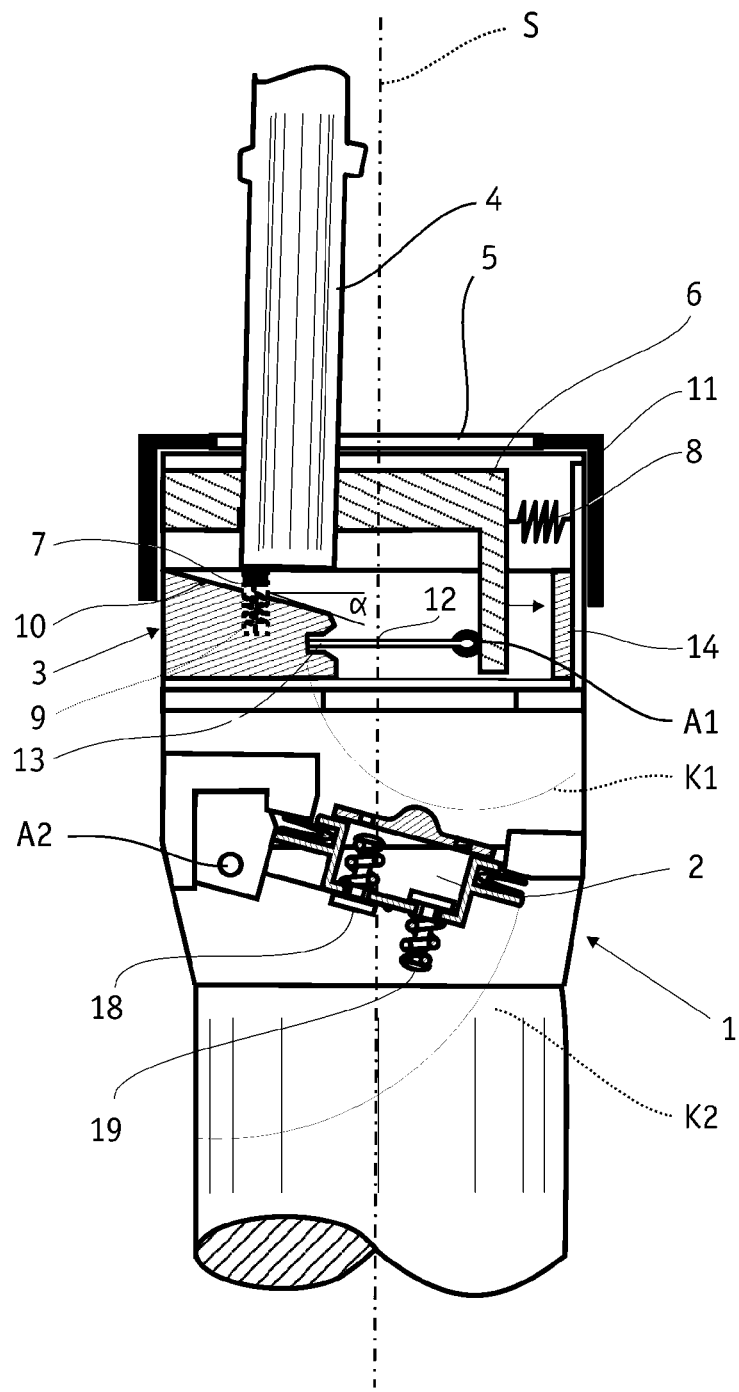
FIG. 3 shows a further configuration of a neck end in a side view with an upper safety mechanism for preventing incorrect filling.

FIG. 3 shows a further configuration of a neck end which likewise has articulation points to each other of the upper pivoting flap 12 and the lower sealing flap 2. In this schematic configuration, the upper closure mechanism is configured in such a manner that it both provides an anti-theft means and contains a means for preventing incorrect filling. The closure mechanism is described in more detail below.

The neck end is in this case likewise formed by a pipe piece 1a which is closed in the upper region by means of a capless closure mechanism 3. The lower sealing flap 2, which seals off the neck, is provided below this closure mechanism 3, which contains the upper pivoting flap 12. To this end, the sealing flap is pressed against a sealing face (not shown here) by means of a spring. The neck end further has over- and underpressure valves and a water outlet (not shown here) by means of which penetrating water can be drained to the outside.

An upper filling opening 5, through which the output pipe 4 of the pump nozzle can be introduced into the neck 1, is provided in the upper region. With further penetration of the output pipe 4 the closure mechanism 3 is overcome as described below, then first the pivoting flap 12 and then the lower sealing flap 2 are opened. The closure mechanism 3 prevents the pipe neck from opening without a pump nozzle being introduced.

To exclude incorrect filling or as far as possible to prevent it, it should only be possible to open the closure mechanism 3 when a pump nozzle is applied for introducing a suitable fuel. To this end, a ring element 14, is inserted into the upper neck section of the pipe piece 1, in which ring element a pushing element is in turn guided displaceably at right angles to the neck axis. The pushing element is U-shaped, it also being possible for it to be an element which is closed all the way round. It is only essential here that it has a passage through which the output pipe 4 can be placed.

Locking means 7 are then pushed down by the inserted output pipe 4, which engage with upper regions in a form-fitting manner in recesses in the pushing element. The pushing downwards causes the locking means 7 to disengage, the pushing element is thus released and can then be displaced in the lateral direction (cf. arrow direction).

A sloping plane is formed below the pushing element as a sliding face 10, which is incorporated into the inner circumferential face of the ring element 14. This sliding face 10 is inclined by an angle α relative to the neck axis of the pipe piece 1 and effects a lateral offset of the output pipe 10 which is inserted through the pushing element when the said output pipe is introduced further into the pipe neck 1.

The output pipe 4 is then pressed against the pushing element due to the lateral offset, which in turn effects a lateral pushing away of the pushing element until the region above the upper filling opening is completely opened for the insertion of the pump nozzle. This unlocking and the subsequent displacement of the pushing element are however only possible when the two opposite locking means 7 are pressed down by the lower edge of the pump nozzle. If this is not large enough, because the diameter of the output pipe 10 is too small, either only one locking means 7 or none at all can be pushed down, which does not release the lock.

The closure mechanism is preferably, as shown here, protected by means of a covering cap 11, which has a slot for inserting the output pipe 4, the width of the slot being somewhat greater than the diameter of the output pipe 4 and the length of the slot corresponding essentially to the displacement distance of the pushing element. Alternatively, a customary cap can also be used, which can be connected to the neck end by means of a screw or bayonet connection.

The first, upper pivoting flap 12 is provided below the upper filling opening 5, which pivoting flap can be pivoted about a first articulation point A2 and provides protection from theft and a first seal as well as protection from coarse dirt. To this end, it is arranged in an articulated manner on the pushing element and is displaced with the latter. On the opposite side it engages in an engagement groove 13 which defines the additional closure flap 12 in the closed state. A restoring spring returns the flap 12 after the pump nozzle is pulled out, so that the said flap can then engage again in the engagement groove 13 when the pushing element slides back.

The lower sealing flap 2 which can be pivoted about the articulation point A2 in this case consists of a pivoting flap which is arranged on a pivoting bearing 15 and is pressed, including a seal 16, by the force of a closure spring against a bearing edge in the pipe neck 1 of the filling neck. In the upper part the sealing flap 2 has a pressure region against which the lower edge of the pump nozzle can rest. In the lower region the sealing flap 2 is provided with an overpressure bypass 19 and an underpressure bypass 18, by means of which the under- and overpressures can be compensated. All types of pressure valves can be used for this.

Figure 4:
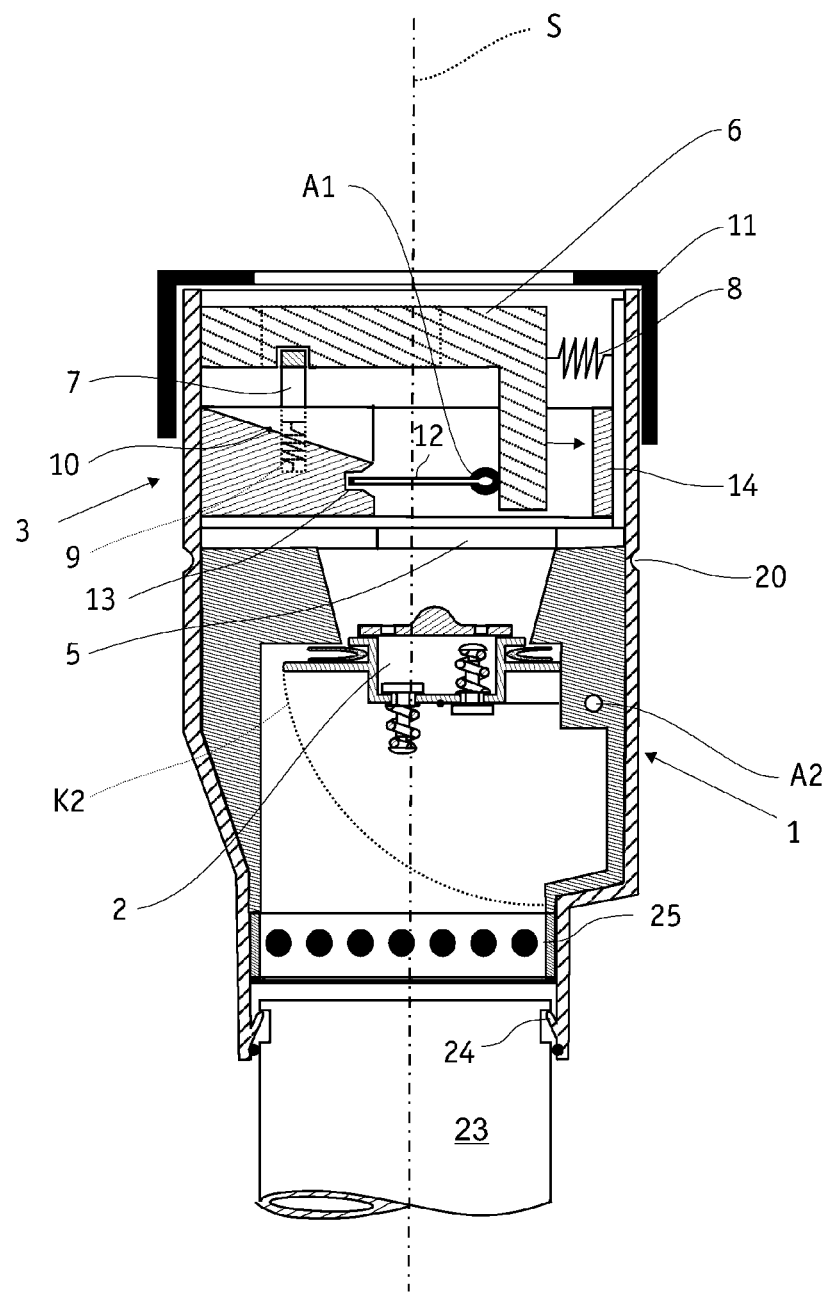
FIG. 4 shows a neck end with an anti-theft means and a predefined breaking point in a side view, in section.

FIG. 4 shows a further configuration of a neck end with a further aspect of the invention which is independent of the previously described aspects. In this case the lower sealing flap 2 is straight, but anti-theft means 25 are provided underneath.

The neck end itself is provided with a predefined breaking point 20 which is formed by a groove-like depression which is stamped from outside into the neck wall, so there is a material weakness here. This predefined breaking point 20 is intended to break off when an impermissible transverse force occurs in the upper region of the neck end, while maintaining the sealing effect of the lower sealing flap 2, and thus the sealing effect of the filling neck is essentially maintained despite an impermissibly high transverse force.

To connect to the pipe neck 23, the neck end shown here is pushed onto the pipe neck 23, resilient retaining tongues latching into recesses in the pipe neck 23 in such a manner that it is only possible to pull it out with destruction of the resilient retaining tongues 24 or by introducing the tool. The latched in resilient retaining tongues engage behind retaining edges 24 of the pipe neck 23 for form-fitting connection to the ends, so that the neck end is held fast. A seal (not shown here) seals off the connection.

A further essential aspect of the present invention which is advantageous even without an oblique position of the lower sealing flap 2 or the other, above-described measures, is shown in FIG. 4. This is an anti-theft means 25 which is arranged below the lower sealing flap 2. This anti-theft means 25 can also be used in connection with the conventional neck ends which are mentioned by way of example in the introduction to the description independently of the previously described features. The applicant expressly reserves the right to claim this complex described below as an independent invention, possibly also as part of a divisional application.

In the mostly capless closure mechanisms according to the invention of the generic type there is in principle the possibility of introducing a hose or a pipe through the double-flap cover in order to pump out the contents of the tank with the intention of theft. The generic neck ends are usually used without an additional upper closure cap which could be screwed on by means of a bayonet or screw connection in order to allow particularly easy filling without the risk of losing such a cap. Such a capless closure is often then covered by means of an outer pivoting flap in the vehicle body, which can be locked by means of the central locking. In this case there is the risk if the pivoting flap is not completely closed that, although the central locking is activated, the corresponding eye may not engage, so that the body-side pivoting flap is not closed despite the locking pin of the central locking being extended.

If no closable cap is present on the filling neck, a third party could introduce a hose through the closure flaps into the filling neck 1 and pump out fuel. A prerequisite for this is that this hose can be introduced into the filling neck 1 so deeply that it comes into contact with the liquid to be pumped out and can dip sufficiently deeply therein. To pump out the entire contents of the container, the hose would therefore have to be introduced into the fuel container through the filling neck 1.

On the other hand, it can be desirable to be able to pump out the fuel container in the event of incorrect filling or else when replacing the fuel container or during other maintenance work on the fuel supply system. Although a corresponding attachment option for a pump function would of course be provided on the removal side of the fuel container, it can nevertheless be desirable to obtain the possibility of pumping out via the filling neck despite an anti-theft means. Various aspects can then be realised by the present invention depending on the wishes of the designer.

In the exemplary embodiment shown in FIG. 4, the anti-theft system is formed by anti-theft means 25 which are in this case in the form of barriers to introduction which run transversely to the plane of the drawing. These barriers to introduction are formed by individual struts, the number and amount of the struts being selected such that a customary hose cannot be placed through it, but the introduced fuel can flow out. In addition to the individual struts shown here and arranged parallel to each other, a labyrinth-like inflow channel, a screen or any other structural element can be used which allows a liquid through but will not let a hose or pipe through. A labyrinth-like inflow channel can for example have a multiply wound flow channel so that a hose cannot be introduced, or only with difficulty. In this case, a corresponding narrowed portion of the channel can allow the fuel to pass through while the passage is blocked for a hose.

It can be ensured, in particular in vehicles which should be filled with diesel fuel, by means of a labyrinth or a coarse-meshed but stable grid as the anti-theft means 25 that the introduced fuel does not also foam excessively, so that foaming up of the fuel, that is, a development of a foam front in the direction of the filling opening 5, can be avoided.

A further anti-theft measure provides for a lateral opening 26 (not shown here) to be provided in the outer side wall of the filling neck, which opening is provided above a safety flap 27 (not shown here). A penetrating hose can be guided outwards through this lateral opening by the anti-theft means 25, so that the thief has the impression that he has introduced the hose into the filling neck 1. Instead, he guides it along the neck on its outer side, so that he cannot reach the liquid level of the fuel and assumes the vehicle is empty. In this case the thief will interrupt the attempted theft in the mistaken assumption that the fuel tank is not full enough. Such a configuration is described further in detail in connection with FIGS. 9, 10 and 11.

Figure 5:
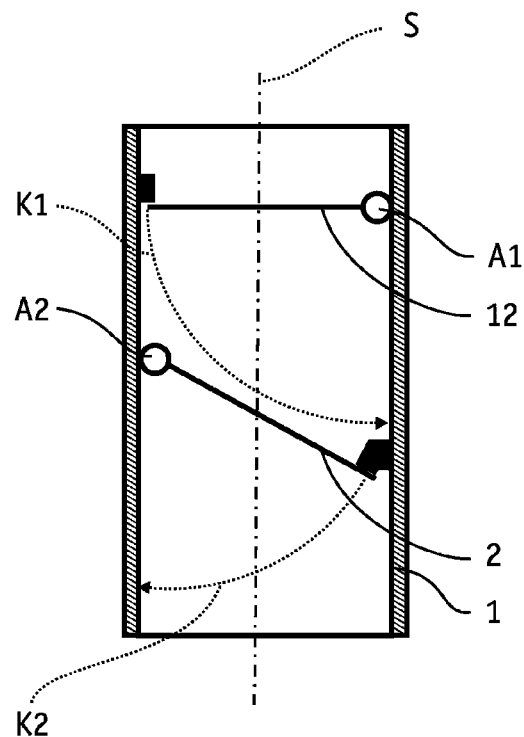
FIG. 5 shows a schematic view of a double-flap arrangement.
Figure 6:
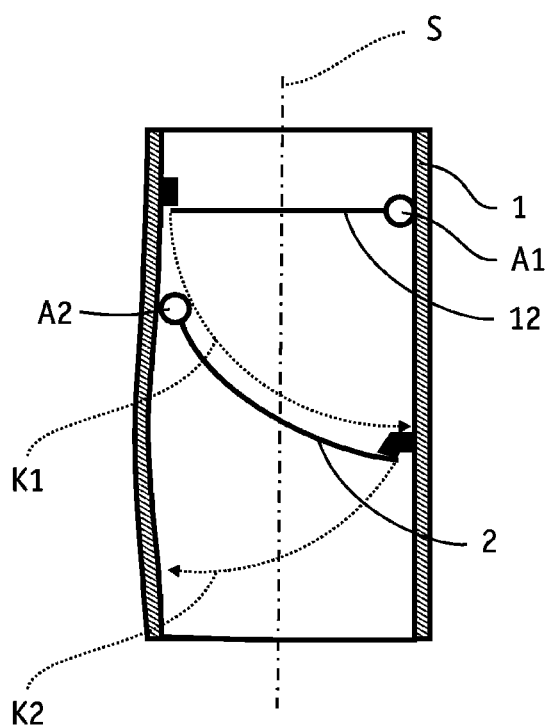
FIG. 6 shows a schematic view of a further double-flap arrangement.

FIGS. 5 and 6 first schematically show two configurations of a neck ends which have two basic arrangements of the upper pivoting flap 12 and of the lower closure flap 2. In the exemplary embodiment shown in FIG. 5, it is a configuration which is similar to the configurations shown in FIGS. 1 and 2. In this case the articulation point A1 and the articulation point A2 are arranged opposite each other, the upper pivoting flap 12 and the lower sealing flap 2 pivoting in opposite directions to each other. The function of this exemplary embodiment has already been described in connection with FIG. 1.

FIG. 6 shows a different configuration of a filling neck 1, in which the two articulation points A1 and A2 are likewise arranged opposite each other. In this case, however, the lower sealing flap 2 is curved, so that it is even more adjacent to the first circular segment path K1. So that the lower sealing flap 2 can be opened completely, the pipe neck 1 curves outwards in the region of the tilted up lower sealing flap 2, so that the curved lower sealing flap 2 can be opened so far that the filling pipe 4 of a pump nozzle (not shown here) can be inserted completely.

Figure 7:
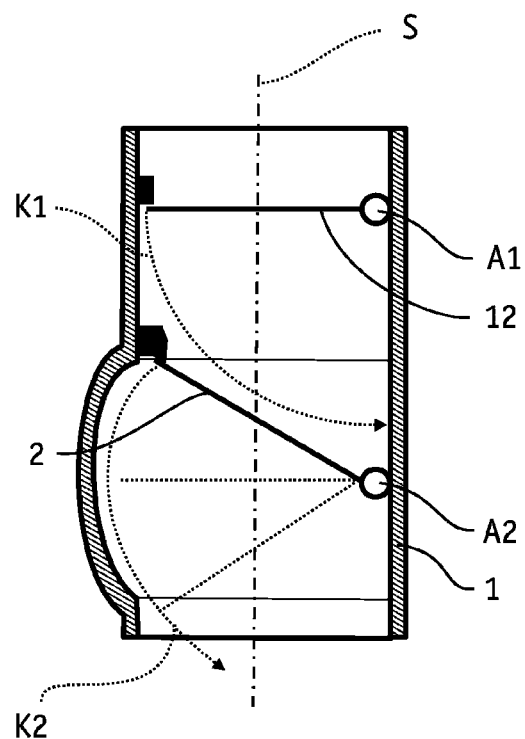
FIG. 7 shows a schematic view of a third double-flap arrangement.

FIG. 7 shows a third configuration of a principle for the shortening according to the invention of a neck end. In this case the stop points A1 and A2 are arranged on the same side of the neck pipe 1, the stop point A1 being arranged more deeply than the stop for the free end of the sealing flap. So that this sealing flap 2 can be pivoted up, a curved portion is likewise provided in the region of the neck pipe 1 which lies opposite the stop point A2, so that the free end of the sealing flap 2 can be pivoted along the circular path K2 which runs through this curved portion.

Figure 8:
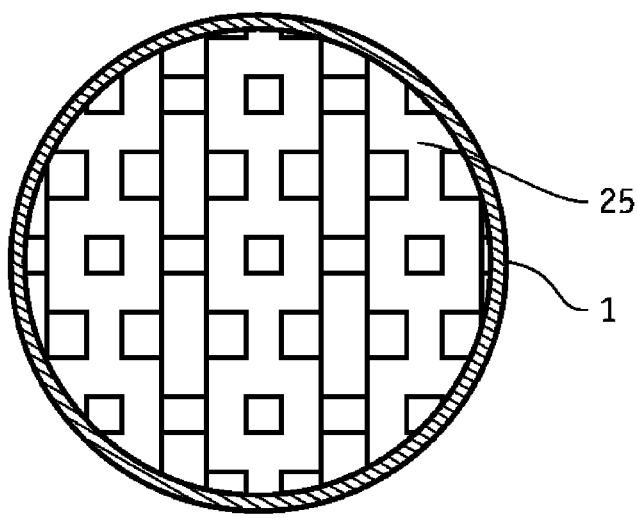
FIG. 8 shows a plan view of a screen-like anti-theft means in the lower pipe neck.

FIG. 8 in turn shows an anti-theft means 25 in the form of a screen which is provided inside the lower section of the neck end. This anti-theft means 25 can of course be provided at any desired point on the pipe neck 1, even just in front of the entrance to the fuel container. With a two-part neck end or with a plastic insert in a single-part pipe neck 1, it is preferably arranged in the upper region so that it can be replaced and mounted together with the neck end or the insert. Such an anti-theft means 25 can either be connected directly to the wall of the neck end or else fixed to a separate ring body or sleeve which is inserted into the neck end.

In the embodiment shown in FIG. 4, for example, the anti-theft means 25 can be fixed to a cylindrical ring which is inserted into the neck end before the upper functional means comprising the lower sealing flap 2 and the upper pivoting flap 12 as well as the other closure means are mounted. Such a ring cannot fall out downwards as it is prevented from slipping out by the retaining edge 24. The receptacle for the lower sealing flap 2 can then secure the ring towards the top, alternatively it can also be prevented from slipping by a tongue and groove connection or a corresponding push fit.

Figure 9:
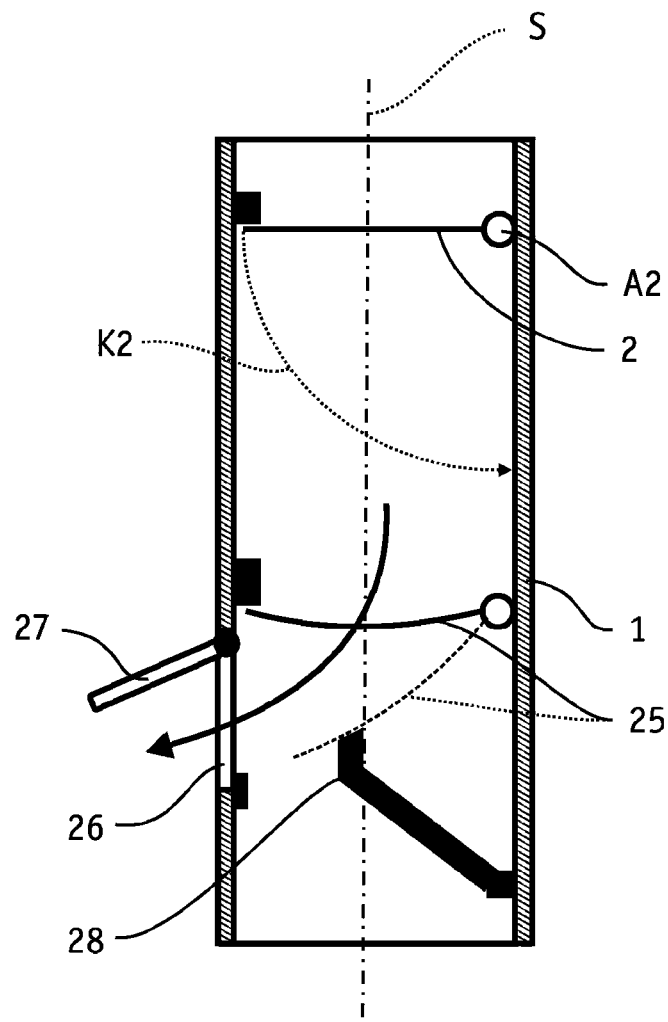
FIG. 9 shows a further variant of the anti-theft means with a hose diversion.

FIG. 9 shows a configuration of an anti-theft means 25 which is arranged below the lower sealing flap 2 and its pivoting region which is predefined by the circular segment path K2. The anti-theft means 25 can, as already described in connection with the lower sealing flap 2, be positioned obliquely or be concave as seen from the filling opening 5 to avoid an increase in the installation height. The two measures can also be combined to reduce the space requirement.

The lower anti-theft means 25 which is configured as a flap is in this case likewise configured to allow liquid through, that is, for example as a screen or grid. This screen or grid can be pivotable until it stops against a stop 28. If a hose is now introduced through the filling opening 5 into the pipe neck 1, this causes the anti-theft means 25 to pivot until a curved or oblique plane is defined by reaching the stop 28, the hose introduced with the intention of theft sliding off this oblique plane and being guided out through the lateral opening in the wall of the neck pipe 1. This lateral opening 26 is of course so big that the hose can be guided through without butting against the lower edge and becoming snagged. In this manner it is impossible for the thief to poke further into the neck or to exert destructive force on the anti-theft means 25.

So that fuel cannot inadvertently escape through the lateral opening 26 in the event of an accident or during normal filling, this lateral opening can be closed by a spring-loaded safety flap 27. This safety flap 27 is pushed open by the hose but is otherwise closed in a sealing manner. To this end, it has corresponding sealing means, and the spring has a corresponding closing force.

Figure 10:
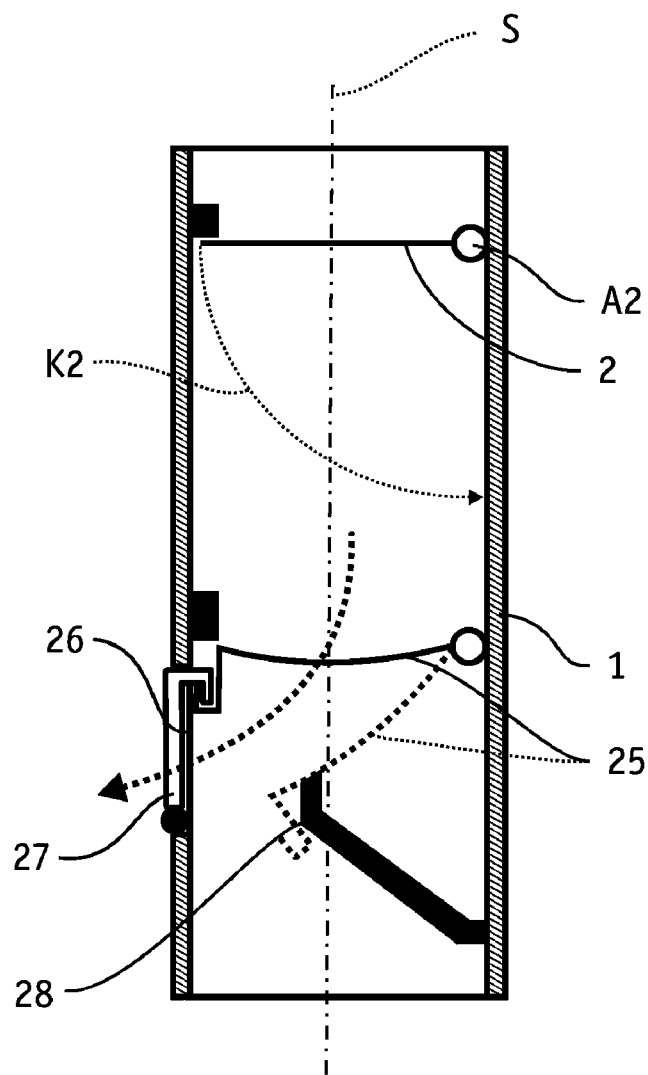
FIG. 10 shows a third variant of the anti-theft means.

FIG. 10 shows a further configuration of an anti-theft means 25. This anti-theft means 25 can also be pivoted by the penetrating hose, in this case however the safety flap 27 is configured in such a manner that it is held by the pivotable anti-theft means 25. In the normal case the anti-theft means 25 is not pivoted throughout the service life of the motor vehicle, so that a permanent connection is possible between the anti-theft means 25 and the safety flap 27 by means of the form-fitting engagements. The anti-theft means 25 is disengaged and the safety flap 27 is detached only if the hose is introduced with the intention of theft. In this case the hose is guided out of the pipe neck 1 through the lateral opening 26 by means of the diverting function already described in connection with FIG. 9.

The configuration according to FIG. 10 has the particular advantage that the safety flap 27 is permanently locked so that fuel is prevented from escaping even in the event of an accident. The connection by means of the form fit can be very reliable so that secure sealing of the lateral opening 26 is ensured.

Figure 11:
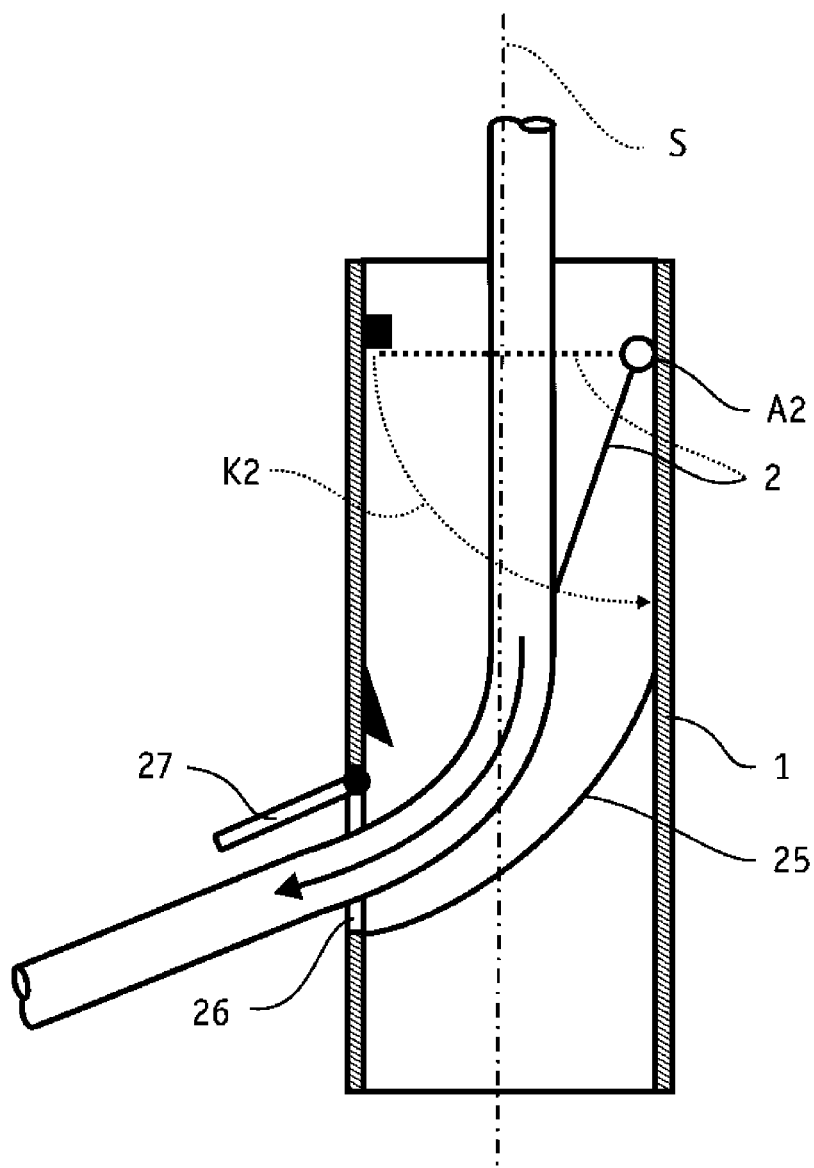
FIG. 11 shows a fourth variant of the anti-theft means.

FIG. 11 shows an alternative configuration of an anti-theft means 25 in which the lateral opening 26 and the safety flap 27 are arranged above the lower end of the anti-theft means 25. This anti-theft means 25 is curved so that in this case too the penetrating hose—as indicated schematically—slides off on the upper side of the anti-theft means 25 and is guided outside the pipe neck 1 through the opening 26.

In the exemplary embodiment shown in FIG. 11, the anti-theft means 25 is configured as a fixed grid. In this case too, the anti-theft means 25 can be rotated by a small angle so that for example a stop is provided slightly below on the side of the lateral opening 26, which stop allows the anti-theft means to be rotated by a few degrees. A form-fitting arresting mechanism can likewise be disengaged by the pivoting of this anti-theft means, which mechanism releases the safety flap 27 in the same manner as the embodiment shown in FIG. 10. With this configuration too, it is thus possible to detach the safety flap 27 by a slight pivoting as a result of the pressure of the penetrating hose. So that the locking means of the form-fitting closure do not obstruct the diversion of the hose in this case, they can for example be provided on both sides of the lateral opening 26 and not on the lower edge of the lateral opening 26, so that the curved hose cannot butt against an edge of the locking means.

In all the configurations with hose diversion, the anti-theft means 25 should be configured in such a manner that the hose can slide simple thereon without becoming wedged on an edge or a mesh. This is ensured in particular by fine-meshed screens, mesh bars, the longitudinal orientation of which is aligned parallel to the slide-off direction of the hose, or similar measures.

The invention claimed is:

1. Neck end for a filling neck of a container, comprising:
a pipe piece which runs along a neck axis; and
a closure mechanism that includes an upper pivoting flap arranged in the pipe piece and a lower sealing flap arranged thereunder, wherein the upper pivoting flap and the lower sealing flap are articulated about respective upper and lower articulation points on opposite sides of the pipe neck, wherein the upper pivoting flap can be opened with its end opposite the upper articulation point along a first circular segment path as a result of a pivoting movement about the upper articulation point by the pressure of an introduced filling pipe, and the lower sealing flap can be opened along a second circular segment path as a result of a pivoting movement about the lower articulation point, wherein the lower sealing flap is arranged in such a manner that it is arranged at an angle to a cross-sectional plane of the pipe neck arranged at right angles to the neck axis when in the closed state, and wherein the lower articulation point is arranged above the lower end of the first circular segment path.

2. Neck end according to claim 1, wherein the lower sealing flap is arranged below a tangent of the first circular segment path parallel to the closed lower sealing flap.

3. Neck end according to claim 1, wherein the lower sealing flap is curved, wherein the lower sealing flap is arranged in such a manner that a concave side of the lower sealing flap is oriented upwards.

4. Neck end according to claim 3, wherein a radius of curvature of the lower sealing flap corresponds to the radius of the first circular segment path.

5. Neck end according to claim 1, further comprising:
an anti-theft means, which is formed by a mechanical barrier to introduction and allows liquid through, wherein the anti-theft means is disposed below the lower sealing flap as protection against drainage and theft, to prevent a pipe or hose from being introduced.

6. Neck end according to claim 5, wherein the anti-theft means is formed by at least one strut which is arranged at an angle to the neck axis.

7. Neck end according to claim 5, wherein the anti-theft means is formed by a screen.

8. Neck end according to claim 7, wherein a lateral opening is provided in the pipe neck below the anti-theft means, wherein the anti-theft means is pivotable and is configured and articulated directly or indirectly in the pipe neck in such a manner that when the anti-theft means is pivoted, a penetrating hose or pipe body is guided out of the pipe neck through the lateral opening.

9. Neck end according to claim 8, wherein the lateral opening is closed by means of a safety flap, wherein a pivoting region of the anti-theft means is limited by a stop, and, when at its maximum pivoting angle, the anti-theft means forms an oblique plane which runs into the lateral opening, and the safety flap can be opened counter to the force of a restoring spring to divert the hose or pipe body penetrating with the intention of theft.

10. Neck end according to claim 9, wherein the safety flap is locked, wherein the locking is configured in such a manner that it is lifted by the pivoting movement of the anti-theft means.

11. Neck end according to claim 7, wherein the anti-theft means is arranged obliquely in the pipe neck, the lateral opening for diverting a hose or pipe body introduced is provided above the anti-theft means in a lower region of the pipe neck, and the lateral opening is closed by a spring-loaded closure flap.

12. Neck end according to claim 11, wherein the anti-theft means is arranged so far below a lower edge of the neck end that a pump nozzle introduced completely into the neck end cannot project with its output pipe as far as the anti-theft means in the pipe neck.

13. Neck end according to claim 12, wherein the neck end is configured as a termination or upper end of a filling neck of a tank of a motor vehicle, with an upper entrance space which forms an insertion region for a pump nozzle and is surrounded by a side wall, the lower sealing flap being arranged in the entrance space, a closure mechanism being arranged above the lower sealing flap, wherein the closure mechanism has an upper filling opening and at least one upper cover, which in a closed state at least partially covers the upper filling opening, and is configured in such a manner that the upper cover is displaced by the introduction of an output pipe of a pump nozzle into the entrance space to release the upper filling opening, in order to allow the output pipe to be inserted through the upper filling opening and the lower sealing flap, and, to form a means for preventing filling up with unsuitable fuel, the upper cover is locked in the closed state by at least one locking means which is configured in such a manner that it can be unlocked only when filling up with suitable fuel, depending on a type-specific shape of the output pipe of the pump pistol.

14. Neck end according to claim 13, wherein the entrance space is configured as a pipe piece with a constant or variable cross section, and the locking means is formed by a blocking means which is mounted in such a manner that it can be displaced out of the blocking position by the output pipe to unlock the upper cover, wherein the neck end has above the upper filling opening a sliding face which is arranged at an angle to a longitudinal axis of the pipe piece and along which the output pipe is guided in a sliding manner when inserted into the pipe piece from an initial position which is offset laterally to the upper filling opening to an insertion position which is coextensive with the upper filling opening.

15. Neck end according to claim 6, wherein the angle is a right angle.

* * * * *